(12) United States Patent
Dress, Jr. et al.

(10) Patent No.: US 7,092,440 B1
(45) Date of Patent: Aug. 15, 2006

(54) HYBRID SPREAD-SPECTRUM TECHNIQUE FOR EXPANDING CHANNEL CAPACITY

(75) Inventors: William B. Dress, Jr., Knoxville, TN (US); Stephen F. Smith, Loudon, TN (US); Michael R. Moore, Corryton, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 338 days.

(21) Appl. No.: 09/671,636

(22) Filed: Sep. 27, 2000

(51) Int. Cl.
*H03K 7/04* (2006.01)

(52) U.S. Cl. .................. 375/239; 375/148; 375/130; 375/260; 375/202; 370/208; 370/350; 370/343; 370/335; 370/525; 370/203; 370/330; 332/103

(58) Field of Classification Search ............... 375/131, 375/201, 134, 239, 148, 130, 260, 202; 455/552; 370/342, 480, 208, 350, 343, 335, 525, 203, 370/330; 332/103
See application file for complete search history.

(56) References Cited

U.S. PATENT DOCUMENTS

| | | | |
|---|---|---|---|
| 3,475,558 A | 10/1969 | Cahn | |
| 4,084,137 A | 4/1978 | Welti | |
| 4,435,821 A | 3/1984 | Ito et al. | |
| 4,521,878 A | 6/1985 | Toyonaga | |
| 4,550,292 A | 10/1985 | Smith | |
| 5,274,665 A | 12/1993 | Schilling | 375/1 |
| 5,351,016 A * | 9/1994 | Dent | 332/103 |
| 5,410,538 A | 4/1995 | Roche et al. | |
| 5,469,469 A * | 11/1995 | Haines | 375/131 |
| 5,521,937 A | 5/1996 | Kondo et al. | 375/206 |
| 5,539,730 A * | 7/1996 | Dent | 370/280 |
| 5,623,487 A | 4/1997 | Natali | 370/342 |
| 5,956,345 A * | 9/1999 | Allpress et al. | 370/480 |
| 6,005,886 A | 12/1999 | Short | |
| 6,018,528 A * | 1/2000 | Gitlin et al. | 370/436 |
| 6,084,871 A * | 7/2000 | Engstrom et al. | 370/350 |
| 6,188,715 B1 * | 2/2001 | Partyka | 375/134 |
| 6,188,717 B1 * | 2/2001 | Kaiser et al. | 375/148 |
| 6,223,053 B1 * | 4/2001 | Friedmann et al. | 455/552.1 |
| 6,229,796 B1 * | 5/2001 | Dent | 370/335 |
| 6,243,397 B1 | 6/2001 | Yun | |
| 6,289,038 B1 * | 9/2001 | Park | 375/131 |
| 6,512,737 B1 * | 1/2003 | Agee | 370/208 |
| 6,563,786 B1 * | 5/2003 | Nee | 370/208 |
| 6,888,887 B1 * | 5/2005 | Shattil | 375/239 |

(Continued)

FOREIGN PATENT DOCUMENTS

EP  0485108  5/1992

(Continued)

OTHER PUBLICATIONS

H. Azad, A.H. Aghvami; Multirate Spread Spectrum Direct Sequences CDMA techniques; Apr. 1994; IEE; pp. 4/1-to-4/5.*

(Continued)

*Primary Examiner*—Emmanuel Bayard
*Assistant Examiner*—Sudhanshu C. Pathak
(74) *Attorney, Agent, or Firm*—John Bruckner, PC (57) ABSTRACT

Methods, systems and devices are described for a direct-sequence spread-spectrum communication scheme that increases the number of users by utilizing a plurality of closely spaced orthogonal carriers that produce overlapping spectra. A method includes overlapping a plurality of direct-sequence spread-spectrum signals using carrier frequencies that are orthogonally spaced relative to a bit rate. The methods, systems and devices provide advantages because they can accommodate an increase in the number of normalized users and can optimize the loading of users across multiple frequency channels.

35 Claims, 7 Drawing Sheets

U.S. PATENT DOCUMENTS

| | | |
|---|---|---|
| 2002/0034191 A1 | 3/2002 | Shattil |
| 2003/0123383 A1 | 7/2003 | Korobkov et al. |
| 2003/0165183 A1 | 9/2003 | Ketchum |

FOREIGN PATENT DOCUMENTS

| | | |
|---|---|---|
| EP | 1128624 | 8/2001 |
| JP | 11-41204 A | 2/1999 |
| WO | WO 00/11823 | 3/2000 |
| WO | WO 01/01584 | 1/2001 |
| WO | WO 02/27992 | 4/2002 |
| WO | WO 03/043235 | 5/2003 |
| WO | WO 2005/025074 | 3/2005 |

OTHER PUBLICATIONS

D. Koulakiotis, A.H. Aghvami; Comparative study of Interference cancellation schemes in multi-user detection; 1997; IEE; pp. 10/1-to-10/7.*

L. Ortigoza, A.H. Aghvami; A Dynamic Resource Allocation for future UMTS; 1998; IEEE; pp. 377-to-381.*

International Search Report for PCT/US01/30421, Sep. 10, 2002.

Yang, et al., "Blind Joint Soft-Detection Assisted Slow Frequency-Hopping Multicarrier DS-CDMA" IEEE Transactions on Communications, vol. 48, No. 9, pp. 1520-1529, Sep. 2000.

Enjia, et al., "The Study of FH/MCFD/SSMA/DPSK Wireless Communication Systems" Department of Electronics, Peking University, International Conference on Communication Technology, pp. S18-06-1 through S18-065, Oct. 22, 1998.

Oh, et al. "The Bandwidth Efficiency Increasing Method of Multi-Carrier CDMA and its Performance Evaluation in comparison with DS-CDMA with Rake Receivers" Department of Information & Communication Engineering, Chonbuk National University, Chonju, Korea, pp. 561-565, May 16, 1999.

Nahier, et al., "Das-Multi-Carrier-Spreizspektrumsystem Helex", vol. 72, No. 16, pp. 78-80, Jul. 23, 1999.

International Search Report & Written Opinion of the International Searching Authority from PCT/US2004/040732, Jun. 10, 2005.

International Search Report & Written Opinion of the International Searching Authority from PCT/US2004/040754, May 10, 2005.

Ezio Biglieri, "Digital modulation techniques" CRC Press LLC, chapter 20, paragraphs 20.1-20.7, 2002.

Benedetto et al., IEEE Enginers Sociedade Brasiliera de Teleconumicacoes: "Polarization shift keying: an efficient coherent optical modulation" SBT/IEEE, pp. 0014-0020, Sep. 3, 1990.

International Search Report & Written Opinion of the International Searching Authority from PCT/US2004/040680, Nov. 3, 2005.

Hara et al., "Overview of Multicarrier CDMA" IEEE Communications Magazine, IEEE Service Center, Piscataway, N.J., USA pp. 126-133, Dec. 1997.

Jong et al., "Performance Analysis of coded multicarrier spread-spectrum systems in the presence of multipath fading and nonlinearities", IEEE Transactions on Communications, vol. 49, No. 1, pp. 168-179, Jan. 2001.

Magill, "Multi-carrier modulated orthogonal code-division multiple access (MCM-OCDMA)" In K. Fazel and G.P. Fettweis (eds.) Multi-Carrier Spread-Specturm, Kluwer Academic Publishers, pp. 105-110, 1997.

Harada et al., "Performance analysis of a new multi-code and multi-carrier hybrid transmission scheme for future broadband mobile communication systems" In K. Fazel and G.P. Fettweis (eds.) Multi-Carrier Spread-Spectrum, Kluwer Academic Publishers, pp. 41-48, 1997.

* cited by examiner

HYBRID SPREAD-SPECTRUM TECHNIQUE FOR EXPANDING CHANNEL CAPACITY

STATEMENT AS TO RIGHTS TO INVENTIONS MADE UNDER FEDERALLY-SPONSORED RESEARCH AND DEVELOPMENT

This invention was made with United States Government support awarded by the United States Department of Energy under contract to UT-Battelle, LLC. The United States has certain rights in this invention.

BACKGROUND OF THE INVENTION

1. Field of the Invention

The invention relates generally to the field of communications. More particularly, the invention relates to spread-spectrum communications.

2. Discussion of the Related Art

In standard direct-sequence spread-spectrum (DSSS) methods, each doubling of the number of users in a given frequency channel decreases the reliability by 3 dB due to code interference. In the typical DSSS systems, carrier separation is based on the chip rate as discussed in the following patent summaries.

A technique for utilizing orthogonal frequency spacing to enhance communication efficiency is disclosed in Natali, U.S. Pat. No. 5,623,487, "Doubly Orthogonal Code and Frequency Multiple Access Communication System" the entire contents of which are hereby expressly incorporated by reference herein for all purposes. Natali discusses orthogonal code division multiple access (OCDMA) radio communication systems having at least one base station and a plurality of remote subscriber terminals, the a method of reducing the sensitivity of OCDMA to access noise due to time base error and multi-path delay spread comprising: (1) reducing the size of the orthogonal signal set on a single carrier, and (2) providing additional carriers with orthogonal frequency spacing for additional subscriber capacity. The orthogonal frequency spacing of Natali is based on the spread-spectrum chip rate as discussed in the following excerpt. "The modulated carrier frequency is selected from one of N frequencies which are orthogonal over a RW (Radamacher-Walsh) chip interval, i.e. the carrier frequencies are spaced by the RW chipping rate. The composite signal is up-converted to the appropriate frequency band for transmission."

A similar technique is disclosed in Kondo, et al., U.S. Pat. No. 5,521,937, "Multicarrier Direct Sequence Spread System and Method," the entire contents of which are hereby expressly incorporated by reference herein for all purposes. Kondo discloses an orthogonal frequency spacing based on the chip rate as discussed in the following excerpt: "The M carriers are designed to be orthogonal to each other. That is, $$\int_0^T \cos(\omega_i t + \phi_i)\cos(\omega_j t + \phi_j)dt = 0 \text{ for } i \neq j \qquad \text{, (Eq. 1)}$$

where T is the bit duration, and $\omega_i$ and $\omega_j$ are different carrier frequencies for $i \neq j$. Orthogonality is achieved by choosing $$\omega_i = m\frac{\pi}{T} + (i-1)n\frac{4\pi}{T} = m\frac{\pi}{T} + (i-1)\frac{4\pi}{T_c}, \qquad \text{(Eq. 2)}$$

where m is an integer, n is the number of chips per bit [that is, the rate at which the bits of the data signal d(t) are chopped into chips], and $T_c$ is the chip duration."

Another technique that uses chip-rate frequency spacing to achieve orthogonality is disclosed in Schilling, U.S. Pat. No. 5,274,665, "Polyopoly Overlapping Spread Spectrum Communication System and Method," the entire contents of which are hereby expressly incorporated by reference herein for all purposes. Schilling discloses a system such as discussed in the following excerpt: "The carried signal of the second transmitter station is shifted in frequency from the carrier signal of the first transmitter station by the chip rate of the message-chip-code signals. The carrier signal of the third transmitter station is shifted in frequency from the carrier signal of the first transmitter station by twice the chip rate of the message-chip-code signals, etc."

A problem with these technologies is user interference due to channel overcrowding. As the number of users increases, this problem is exacerbated.

Modern spread-spectrum communication systems, both CDMA and FDMA, are reaching the limit of user saturation in populated urban areas. The usual solutions of allocating more bandwidth with a multiplicity of standards and frequency channels are unattractive due to the hardware cost to the vendor and the proliferation of specialized consumer units required. To take a particular example, consider the Industrial, Scientific, and Medical (ISM) band of 902 to 928 MHz that is commonly used for unlicensed communications, the standard U.S. IS-95 cellular telephone bands of 824–849 MHz (transmit) and 869–894 MHz (receive), or the PCS bands from 1850–1910 MHz (transmit) and 1930–1990 MHz (receive). A typical ISM vendor will choose a 915-MHz carrier for DSSS or frequency-hopping spread-spectrum (FHSS) CDMA (code-division multiple-access) channels. Each user is assigned a pseudo-random code such that (few) users active on the same carrier frequency have little probability of interfering with one another. The code itself is unambiguous to decode, allowing effective and noise-free transmission of digital information (usually) at baud rates consistent with high-quality voice communication.

Since these codes appear to be random, one interferes with another by appearing as random noise. If two users are transmitting at the same power level (as seen by a receiver) using one of the same signals or codes, the ability to decode the desired signal in an error-free manner will degrade by 3 dB. If the number of interferers is doubled to 2 (three transmissions on the same channel), the effective signal-to-noise degradation will be by 6 dB. In a similar manner, for each doubling of users that generate noise-like random signals as far as decoding a particular signal is concerned, the ability to detect and use the desired signal will degrade by an additional 3 dB.

A simplistic solution to this problem is to allocate a new frequency channel once the previous one has reached capacity as defined by a certain level of inter-user interference. The drawbacks to this simplistic approach are twofold: (1) such allocations must be coordinated with the services presently extant and (2) the particular band is soon full; e.g., the 915-MHz ISM band can only support 14 such channels if the chipping rate is 1 MHz.

Other solutions to relieve this overcrowding have been known for many years and are discussed in such texts as the one by Dixon[1] and Peterson[2] under the rubric "hybrid methods." The central idea of these solutions is to frequency hop between DSSS channels. The standard discussion of hybrid FDMA/CDMA systems is from the processing-gain standpoint. Various authors have correctly and consistently pointed out that the increase in processing gain to be expected from any such hybrid system is approximately 3 dB in a typical case.

What is missing in these prior art discussions that start with a predetermined number of users and frequency-hop channels is a method that accommodates a probabilistic or deterministic increase in the number of users normalized to a standard bandwidth (bits/sec/Hz, for example). What is needed, therefore, is an approach that accommodates an increase in the number of normalized users.

What is also missing in these prior-art discussions are methods for optimizing the loading or equalization of the users across multiple, closely spaced frequency channels within the allocated band. What is also needed, therefore, is an approach to optimizing the loading or equalization of the users across multiple, closely spaced frequency channels within the allocated band.

Heretofore, the requirements of accommodating an increase in the number of normalized users and optimizing the loading of users across multiple, closely spaced frequency channels have not been fully met. What is needed is a solution that addresses both of these requirements.

SUMMARY OF THE INVENTION

A goal of the invention is to simultaneously satisfy the above-discussed requirements of accommodating an increase in the number of normalized users and concurrently optimizing the loading of users across multiple frequency channels which, in the case of the prior art, are not satisfied. A goal of the invention is to garner significant benefits by using the channel bit rate (or integral multiples, or integral fractional multiples, thereof) as a basis for orthogonality.

One embodiment of the invention is based on a method comprising overlapping a plurality of direct-sequence spread-spectrum signals using carrier frequencies that are orthogonally spaced relative to a common bit rate (or, again, integral multiples thereof). Another embodiment of the invention is based on an apparatus comprising: a pseudonoise (PN) code generator; a frequency synthesizer coupled to said PN code generator; a coincidence gate coupled to said PN code generator; a data gate coupled to said coincidence gate; an XOR gate coupled to both said data gate and said PN code generator; a balanced modulator coupled to both said XOR gate and said frequency synthesizer; and a switch coupled to said balanced modulator, wherein a set of p bits provided to said frequency synthesizer selects an operating band, said PN code generator provides a subset of m bits from a full n-bit PN code to said frequency synthesizer to generate a carrier frequency within said operating band, and said PN code generator provides a subset of l bits from said full n-bit PN code to said coincidence gate to: (1) gate a burst of data from said data gate through said XOR gate to said balanced modulator and (2) gate on said switch, said PN code generator providing said full n-bit PN code to said balanced modulator via said XOR gate. Another embodiment of the invention is based on a computer program comprising computer program means adapted to perform the steps of overlapping a plurality of direct-sequence spread-spectrum signals using carrier frequencies that are orthogonally spaced relative to a common or compatible bit rate. Another embodiment of the invention is based on a method comprising providing a direct-sequence spread-spectrum communication system that increases a number of users by utilizing a plurality of closely spaced orthogonal carriers that produce overlapping spectra.

These, and other goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

Within this application several publications are referenced by superscripts composed of Arabic numerals within parentheses. Full citations for these publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. patents disclose embodiments that were satisfactory for the purposes for which they are intended. The entire contents of U.S. Pat. Nos. 5,623,487; 5,521,937; and 5,274,665 are hereby expressly incorporated by reference herein for all purposes.

The invention can include combining overlapping direct-sequence spread-spectrum (DSSS) signals by using carrier frequencies that are orthogonally spaced relative to the bit (or symbol) rate rather than the chip rate. This enables a further combination of frequency-hopping spread-spectrum (FHSS) and/or time-hopping spread-spectrum (THSS) with the DSSS signals, thereby optimizing the figure of merit bits/sec/Hz and permitting an even higher number of users.

Significantly, the invention can permit $x^2$ users on the same channel at the same user-interference level where previously there were only x. Here, "channel" refers to the collection of closely spaced frequency channels, which is only marginally broader than a single DSSS channel. For example, given a situation where 16 users were all that the channel could support (due to various noise sources, interferers, and multipath effects), the invention could increase the number of users to approximately 256 with the same average level of user interference as before, for both DSSS and hybrid (DSSS/FHSS; DSSS/THSS; and DSSS/FHSS/THSS) systems. The tradeoff (cost) is a slight increase in overall bandwidth and requisite circuitry.

By strict orthogonality, as expressed by the Kondo relation (Eq. 2), it is meant that the signals in question have exactly zero overlap, which Kondo has utilized for $1/T_c$ or chip-rate spacing. That is, the integral in Eq. 1 vanishes. In the present invention, we are utilizing integer multiples and submultiples of $1/nT_c=1/T_b$ (or carrier spacings at the bit rate or multiples thereof) that cause Eq. 1 to vanish or approach zero. If the carrier frequency, $f=\omega/2\pi$, is precisely an integer multiple of the bit rate, then any two carriers, independent of their relative starting phases, will integrate to zero in Eq. 2. However, if the carrier frequency is not an integer multiple of the bit rate, the integral will only approach zero for random phase relationships. As an example, the average overlap between two arbitrary signals in the 915-MHz band for a chipping rate of 1 MHz and 1023 chips per bit is typically a few percent or less, with a maximum of perhaps 8%. In this example we utilize two carriers obeying the relationship:

$$\omega_j=\pi(j+k)/n \cdot T_c \text{ and } \omega_k=\pi(j-k)/n \cdot T_c \quad \text{(Eq. 3)}$$

where j is an integer, and n and $T_c$ are defined as above. Typically, the index j is a large integer such as 1,870,000 for the conditions in the example above. For the frequency spacing between two adjacent carriers to be equal to the channel bit rate, k=½. For the example used here, the frequency spacing utilized by Kondo is twice the chipping rate, or 2 MHz. For the orthogonal case of this invention, the frequency spacing is less than 1 kHz, providing a 2000-times benefit in carrier spacing density. This may be seen simply by letting k=½, j=1,870,000, $T_c$=1/(1 MHz), and n=1023 in Eq. 3 and taking the difference between the two frequencies.

Now consider values of k less than ½. The Kondo relation (Eq 2) is strictly valid for signals of random relative phase with respect to each other, i.e., for a set of asynchronous signals, which is the case for the bulk of the applications of the instant invention. However, in the scenario involving a set of co-phased or synchronous signals, such as those transmitted from a common base-station antenna (e.g., in an IS-95 CDMA cell-phone or equivalent system), the signals in the set will retain their mutual orthogonality at a frequency spacing of exactly ½,¼,⅛, etc. or other fractional values of the bit rate as well as at integral multiples (i.e., ×1, ×2, ×3, . . . ) of that ½-bit rate, depending on the choice of relative phase between the carriers. The allowable orthogonal frequency spacings for groups of synchronous signals with zero restive phase differences are therefore ½, 1, 1½, 2, 2½, 3, 3½, . . . times the bit rate, giving twice as many frequency choices as in the asynchronous case. Thus, synchronous signal sets (e.g., found in common multiple co-phased base-station transmitters and synchronized modems or transmitters on a common coaxial or twisted-pair cable) can be successfully operated in an orthogonal mode at frequency spacings of one-half (and other sub-multiples) of the common bit rate and thus achieve at least twice the user density of the asynchronous signal case. (In the following discussions, however, the more general case of asynchronous [non-phased] signal sets will be assumed, unless specifically stated otherwise).

Figure 1A:
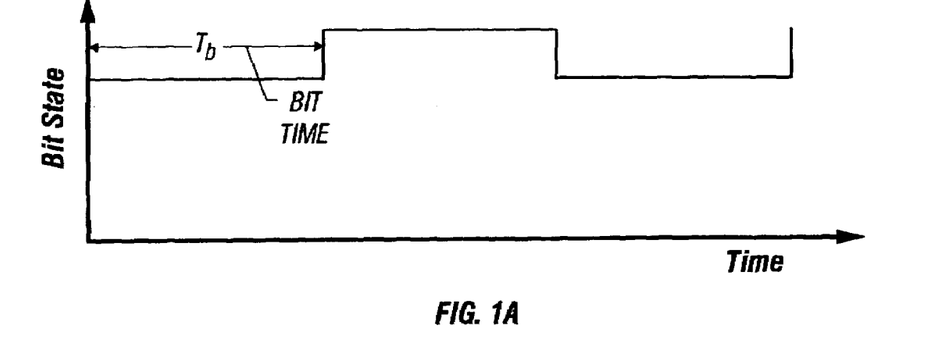
FIG. 1 illustrates a chip stream example, representing an embodiment of the invention.
Figure 1B:
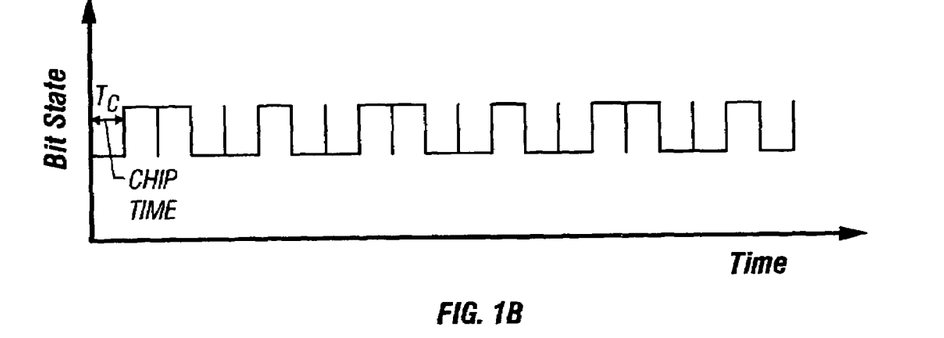
Figure 1C:
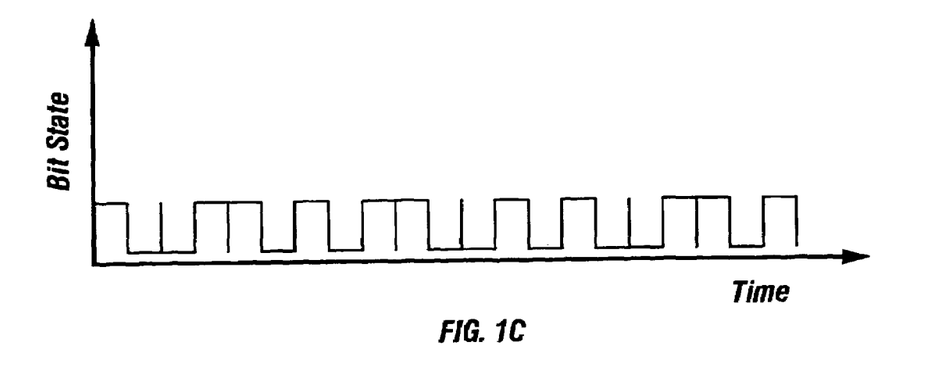

FIG. 1 shows an example of how chips and bits are related in a typical DSSS system. In this example, the bit rate (symbol rate) is $T_b$ bits/second, and the chip rate is $T_c$ chips/second, with seven chips per bit. Thus, the chipping rate is seven times faster than the bit rate. As will be discussed later, the typical orthogonal frequency spacings are based on $f=1/T_c$ which in this example is seven times greater than $f=1/T_b$. In all meaningful spread-spectrum systems, $T_b/T_c$ will be at least 10 and often is in the range of 100 to 1000 or greater. In more detail, FIG. 1 a) shows a bit (symbol) stream of "010" which is multiplied logically by the signal shown in b), which is the periodic repeating PN code which in turn yields the signal shown in c), which is the digital stream used to modulate the carrier in a DSSS system and which can alternatively be used to control the frequency or time allocations in a FHSS or THSS system.

The invention can include the use of multiple frequency channels that are chosen to be as closely spaced as possible, consistent with the bit (symbol) rate and a orthogonality condition (to be discussed below). In practice, this means that a single-channel system operating at a nominal 915 MHz with a chipping rate of 1 MHz, to take a particular example, would have a bandwidth of roughly 2 MHz. Splitting the original 915-MHz carrier into 16 equally spaced carriers, 8 on either side of the original carrier, and separating them by 20 kHz would increase the bandwidth to 2.30 MHz, or by 15%. Other spacings are possible and are determined by the particular way the carrier frequency, the chipping rate, and the baud rate jointly determine the orthogonality condition. If interference due to 16 users reached the limit of acceptability on the single 915-MHz channel and the 16 new channels split out from the central carrier were orthogonal, the hybrid system could support 16 users on each of the 16 channels with approximately (on-average) the same level of interference. Thus, the channel capacity of the original 2-MHz band centered at 915 MHz has been increased from 16 to 256 users by paying the cost of a slight increase in bandwidth and a slight statistical increase in interference. The result is a vastly more efficient use of bandwidth with almost no degradation in performance!

Commercial CDMA and FDMA spread-spectrum systems may have up to 64 users in a cell operating on a single carrier frequency. Other vendors in the same geographical area, perhaps in partially overlapping cells, will offer a similar service but at a different carrier frequency. The carrier or central frequencies are spaced sufficiently far from each other to minimize interference between services. By increasing the center distances slightly to allow for the multiplicity of orthogonal channels that each carrier would now be expanded to fill, the number of users that could be accommodated in a given geographical region can be increased by 10- to 1000-fold. In military applications, there are perhaps 512 users on a single channel. Our method would allow perhaps as many as 2500 users, at a slight cost in bandwidth, power, and hardware.

1. Controlled-Access and Frequency-Orthogonal Channels

If both the access to transmission and the distance between transmitter and each receiver in the system are controlled or known in advance, then the product user gain envisioned above is achievable by ensuring that there is no spectral leakage between channels (i.e., the different frequency channels are selected to be mutually orthogonal). In this case, the base station allocates each user to a channel in a synchronous fashion and into orthogonal channels by assignment, resulting in no interference between channels and a channel loading factor that is uniform across all channels. Keeping with the above example, suppose there are 16 channels with 16 users on each channel. If the channels are truly orthogonal, the jamming margin at each receiver is required to be only 12 dB. The orthogonality property is then the determining factor. The orthogonality properties will be discussed below in more detail.

Uses of such a system may be limited to situations where the distances between the base station and the users are fixed. Examples include within a building, over broadband cable, or between buildings in an urban setting.

2. Random-Access Methods

If the requirement of knowing the distances between base station and each receiver is cannot be met, then the best possible solution is one of random access. Here, users are assigned frequency channels based on their own CDMA codes without any intervention from the base station. The methods of probability theory ensure that channel usage will be equalized on average, without sustained or severe cases of interference between users.

To recapitulate the problem being solved, consider a DSSS system using pseudo-random noise (PN) codes where m chips per symbol are used. Suppose that there is one sender and the carrier is confined to a particular frequency channel. This single channel can support multiple simultaneous transmissions as long as each sender has his own PN code that is orthogonal to or has small cross-correlations with those of other senders occupying the same channel. Since the sequences are pseudo-random, a received sequence not meant for the particular receiver will appear as white noise, adding 3 dB of noise to the front end. Likewise, for every doubling of senders on the chosen channel, 3 dB of effective interference noise will be added. In particular, 16 senders will degrade the reception for any particular receiver by 12 dB, and 256 senders will degrade reception by 24 dB. If we assume the effective usable single-receiver sensitivity figure is −105 dBm, then with 256 senders each receiver must have an input signal level of −81 dBm to be able to properly separate the signal from the interference. Otherwise stated, the signal strength at the receiver must rise from the 1.26 µV (at −105 dBm) up to ~20 µV for proper reception. Equivalently, each receiver must have a jamming margin of 24 dB. These are difficult performance figures to achieve.

To increase the number of users, the jamming margin must be increased. There are two standard methods available: (1) increase the spectrum bandwidth or (2) decrease the data rate. Both of these choices are likely to be unacceptable since they both entail a significant system performance degradation.

The situation would dramatically improve if the 256 senders could be partitioned among 16 channels. If cross-channel interference is negligible by assigning orthogonal channels as above, then we would be back to the −93 dBm case, with only 12 dB of extra jamming margin required. This can be accomplished without requiring an additional 15 base stations or demanding 16 times the spreading bandwidth. By suitable choice of deterministic or random channel access, the number of users can increase from n to roughly $n^2$ while maintaining the same approximate receiver sensitivity.

Suppose we have DSSS codes of n chips each, phase modulated, according to the code words. When sending a code word, look at its first 4 bits (for the example of 16 users). Interpret this group of bits as a frequency shift between 0 and 15 offset from the erstwhile center frequency, and shift the carrier frequency accordingly. The result is a cycling through a set of frequencies in a manner known to the receiver and phase-modulating the carrier with each chip in the usual manner. This can be done every 4 chips or every single or y code words. Note that the frequency resolution is very sharp due to the level of processing gain which is retained for each user.

To synchronize a receiver for a particular code sequence, start searching for the first code word around its expected frequency, which is determined by the code itself. When found, the frequency is established and the frequency location of the next chip sequence is known from the PN code in use. The scheme presented here will reduce interference due to multiple users since, on average, all transmitters using different codes will be transmitting over a different frequency channel at any given instant. Thus, for a 16-channel frequency-division scheme, there will be a conflict only 1/16 of the time, reducing the interference problem. Any severe collisions can be corrected via retransmission requests or error-correcting codes.

The advantage of this method lies in its random nature—it is a probabilistic method with no channel assignment required by the base station. Other advantages are that no single user can be jammed all of the time if a single channel has a major interferer; also, any jamming by a persistent single interferer affects users only to the extent that their codes dwell on the interfering channel.

3. Spacing Determination

In Kreyszig[3] we have the classical definition of orthogonality, "The functions $g_m$ and $g_n$ are said to be orthogonal on the interval $a \leq x \leq b$ if . . ."

$$(g_m, g_n) = \int_b^a g_m(x) g_n(x) dx = 0. \quad (1)$$

Any non-trivial signals will also meet the conditions that $$(g_m, g_m) = \int_b^a g_m(x) g_m(x) dx \neq 0.$$

$$(g_n, g_n) = \int_b^a g_n(x) g_n(x) dx \neq 0.$$

The following discussion addresses a system with several transmitters and one receiver that is "programmed" to detect the signal $S_1$. The receiver operation fundamentally multiplies the best guess of the desired signal by the incoming composite waveform. The low-frequency baseband product is typically the demodulated data. Therefore, the output of the receiver is $$\int S_1(t) * (S_1(t) + S_2(t) + S_3(t) + \ldots + I_1(t) + \ldots + N_0(t)) dt \quad (2)$$

where $S_2$, $S_3$, . . . represent other users, $I_1$ . . . represent interference sources and $N_0$ represents noise. In equation (2) the desired output is from the $S_1^2(t)$ term. The remaining products represent products that reduce the signal-to-noise ratio (SNR).

Now, we reduce our example to two transmitted signals having different carrier frequencies ($\omega_x$), spreading codes ($PN_x$) and message signals ($m_x$). We assume that the message signal is digital with a data rate of $1/T_b$ and that the PN code is clocked m times faster, at a rate of $1/T_c$, where m is the length of PN code in chips (jargon for spreading code bits). So, we desire $$\int_t^{t+T_x} \cos(\omega_1(t)) * PN_1(t) * \quad (3)$$
$$m_1(t) * \cos(\omega_2(t)) * PN_2(t) * m_2(t) \, dt = 0$$

where $T_x$ is set to $T_c$ in typical CDMA or OFDM (orthogonal frequency-division multiplex) systems. It is very important to appreciate that the invention can take of advantage of the typical hardware operations in a DSSS receiver by setting $T_x$ equal to $T_b$, (or integral multiples of $T_b$). This increases the integration time by a factor of m, thus reducing the minimum orthogonal frequency spacing by a factor of m. Other useful (though not minimal) orthogonal spacings will occur at integral multiples of this minimum frequency spacing.

As mentioned above, the coherent detectors in typical receivers multiply the incoming signal by an estimate of the desired signal. Integrating the product over the period of a single bit of the message derives the original message, once a bit-clock synchronization is established. In typical spread-spectrum receivers, the higher speed spreading-bits (chips) are clocked into a demodulator. Therefore, the integration period is equal to or less than the chip rate. By utilizing signals that are already present in the receiver, a separate calculation can be made that now integrates over the entire message bit period. This allows the signals to be orthogonally spaced at $1/T_b$ frequency intervals, which is n times closer than the $1/T_c$ intervals used in the existing-art systems.

The phrase integral multiple as used in relation to the bit rate, means a rate less than the chip rate, preferably less than half the chip rate. The phrase sub-multiple, as used in relation to the bit rate, means a fraction of the bit rate. The term coupled, as used herein, is defined as connected, although not necessarily directly, and not necessarily, mechanically. The term deploying, as used herein, is defined as designing, building, shipping, installing, and/or operating. The term program or phrase computer program, as used herein, is defined as a sequence of instructions designed for execution on a computer system. A program may include a subroutine, a function, a procedure, an object method, an object implementation, an executable application, an applet, a servlet, a source code, an object code, and/or other sequence of instructions designed for execution on a computer system.

EXAMPLES

Specific embodiments of the invention will now be further described by the following, nonlimiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

Example 1

Figure 2:
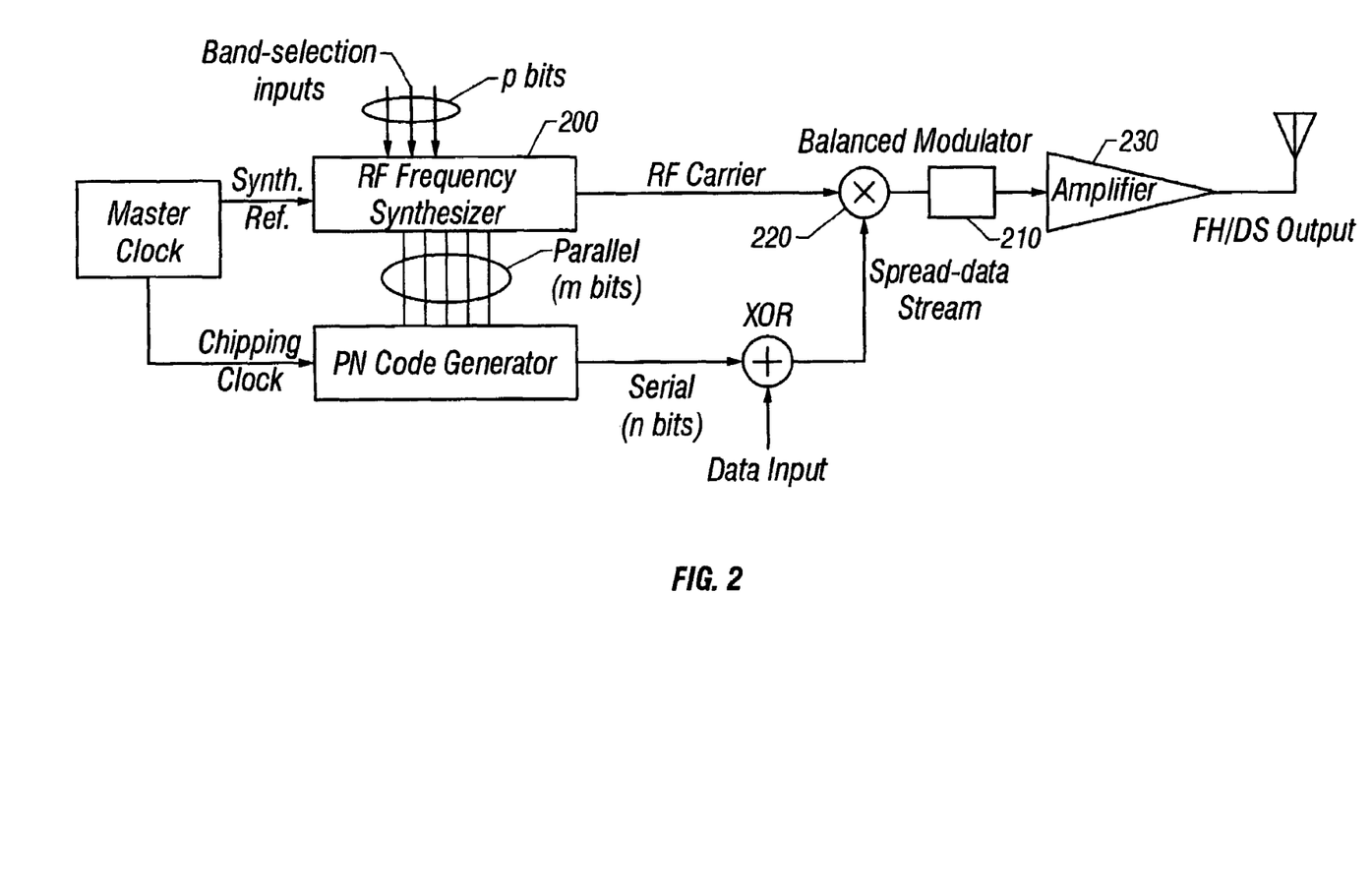
FIG. 2 illustrates a block schematic view of a hybrid frequency-hopping/direct-sequence spread-spectrum transmitter (binary phase-shift keying [BPSK]-modulated), representing an embodiment of the invention.
Figure 3:
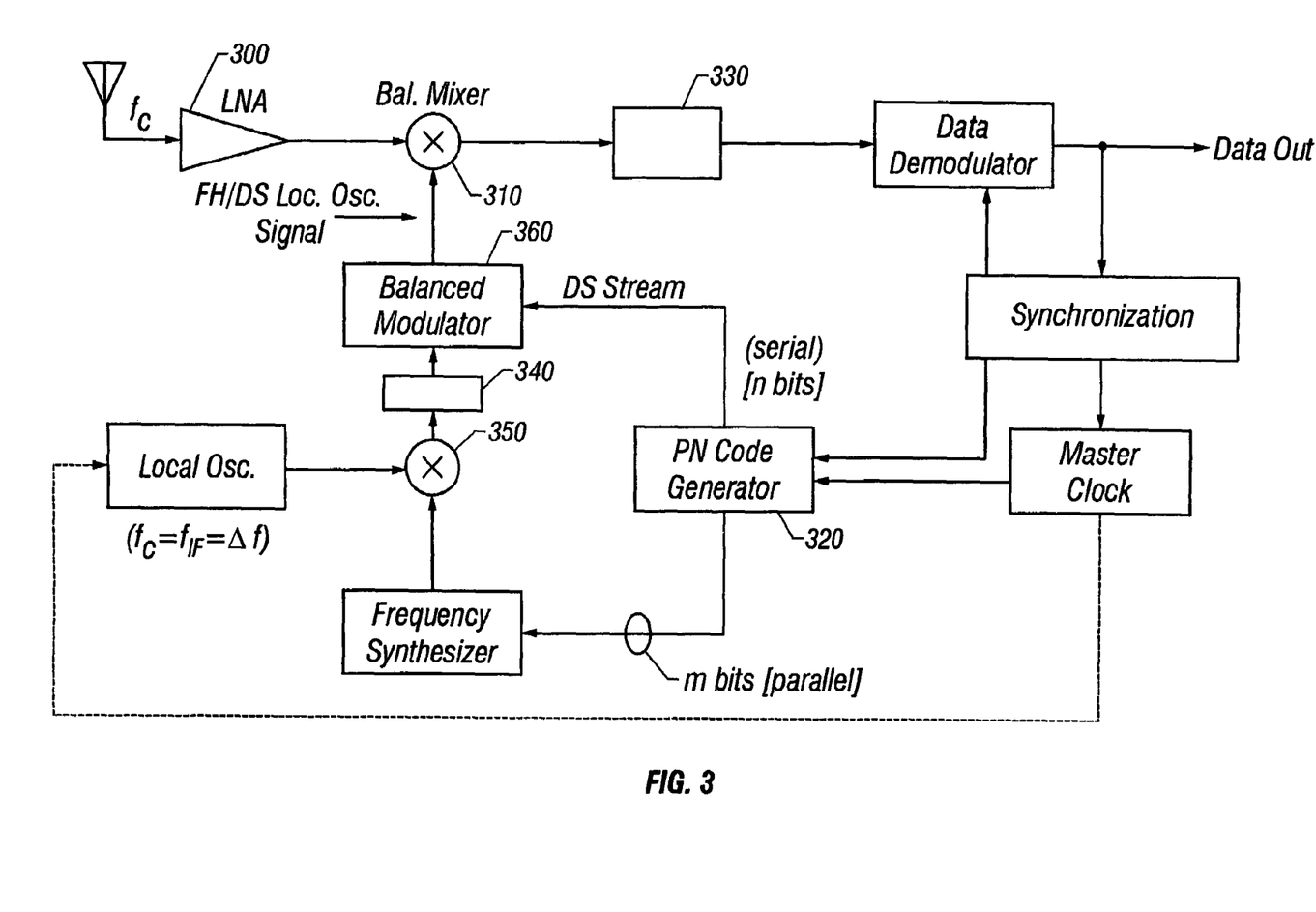
FIG. 3 illustrates a block schematic view of a hybrid frequency-hopping/direct-sequence spread-spectrum receiver (BPSK-modulated), representing an embodiment of the invention.

Referring to FIGS. 2–3, a hybrid frequency-hopping/direct-sequence (FH/DS) spread-spectrum scheme is depicted.

The hybrid frequency-hopping/direct-sequence (FH/DS) spread-spectrum transmitter depicted in FIG. 2 is configured for standard BPSK data modulation. A subset of m bits from the full n-bit (n>m) PN code is used in synchronization with the chipping sequence to drive an RF synthesizer 200 to generate the exact RF carrier frequency desired for the hybrid SS transmission. Note that an additional p higher-order bits in the RF synthesizer word are used to specify the RF operating band; the lower-order m bits from the PN register select the individual hopping channels. An optional low-pass filter 210 can be located between a balanced modulator 220 and an amplifier 230.

The corresponding hybrid FH/DS spread-spectrum receiver architecture is shown in FIG. 3. Here, the incoming hybrid signal is amplified in a front-end low-noise amplifier (LNA) 300, down converted to the desired intermediate frequency (IF) via a balanced mixer 310, and finally demodulated in a conventional manner. As in the transmitter above, m bits from an n-bit PN code generator 320 are used to select the desired hopping channels within the selected RF receiving band. A fixed local-oscillator signal is used to up convert the synthesizer output frequency to the appropriate value to produce the target IF; this final programmable FH/DS local oscillator signal is modulated by the PN polynomial code sequence and applied to the balanced mixer 310 at the top left of the diagram. This spread signal then (when properly synchronized) automatically despreads the DS portion of the incoming hybrid signal; the hopping of the local signal also removes the FH component, leaving a simple data-modulated single-frequency signal at an input to an IF filter/amplifier chain 330. Synchronization for the system is derived from the data stream, the RF carrier frequency, or a combination thereof. An optional low-pass or band-pass filter 340 can be located between an frequency mixer 350 and a balanced modulator 360.

Example 2

Figure 4:
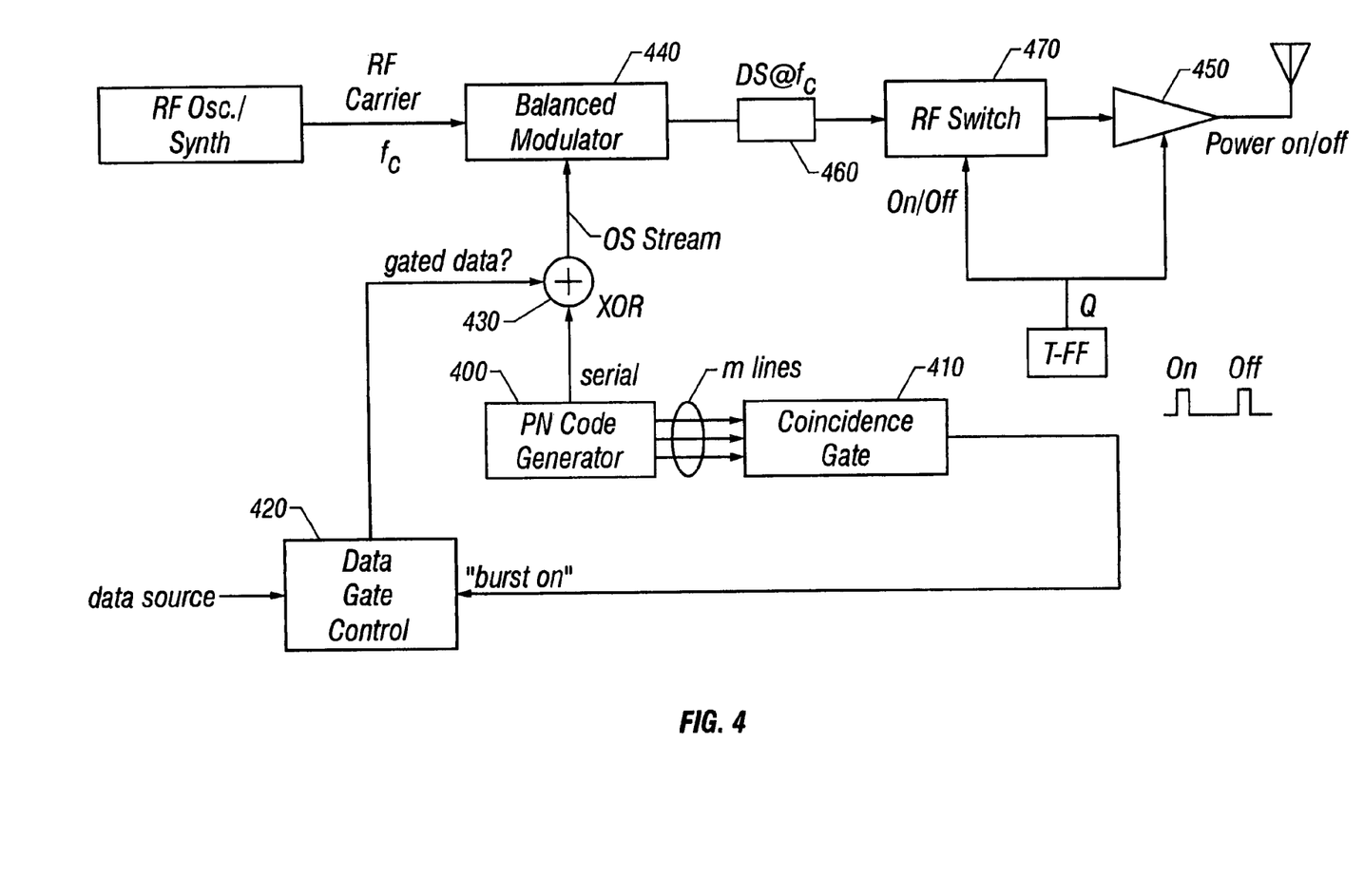
FIG. 4 illustrates a block schematic view of a hybrid time-hopping/direct-sequence spread-spectrum transmitter, representing an embodiment of the invention.
Figure 5:
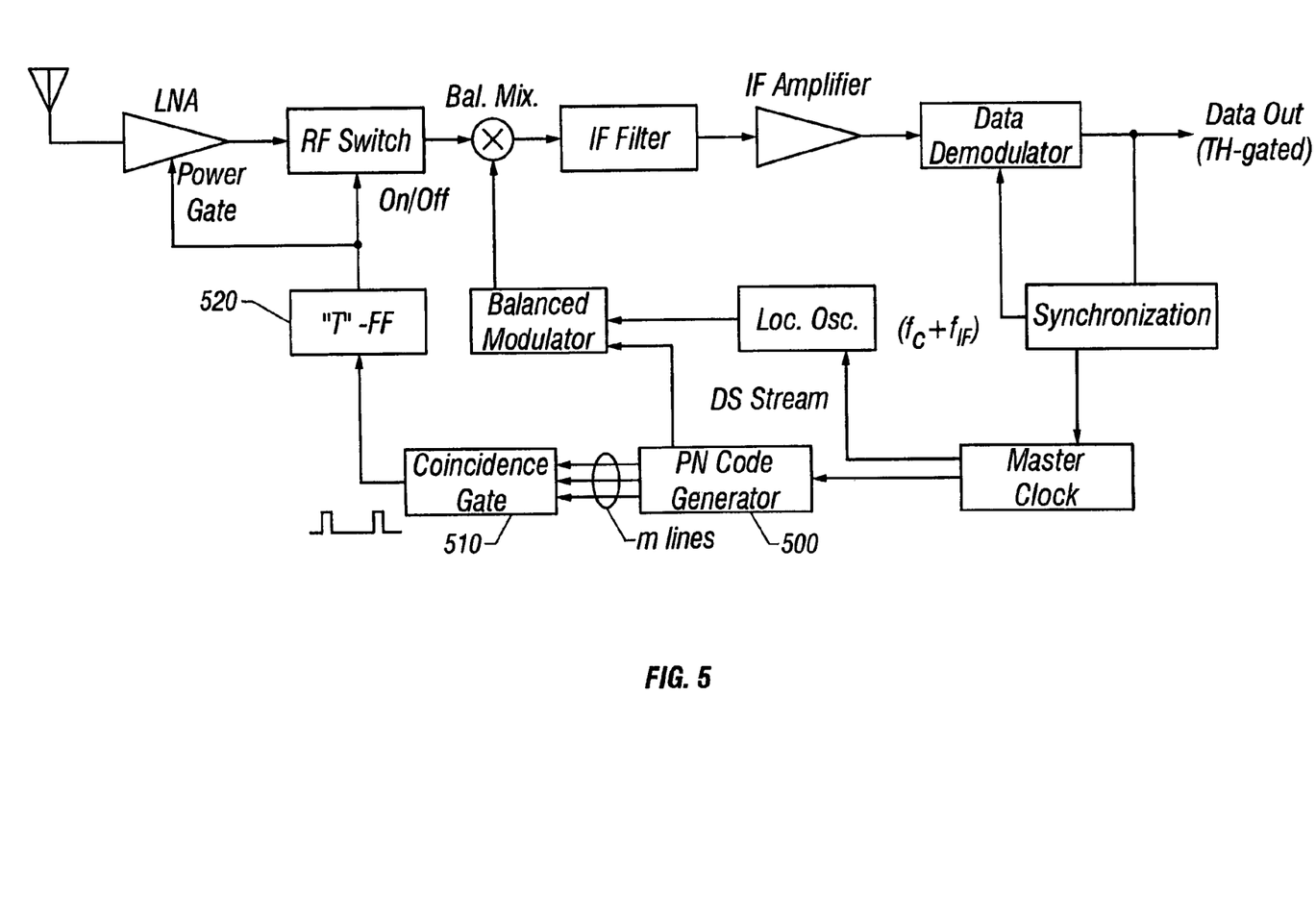
FIG. 5 illustrates a block schematic view of a hybrid time-hopping/direct-sequence spread-spectrum receiver, representing an embodiment of the invention.

Referring to FIGS. 4–5, a hybrid time-hopping/direct-sequence (TH/DS) spread-spectrum scheme is depicted.

FIG. 4 details a hybrid time-hopping/direct-sequence (TH/DS) transmitter. Here, as in the previous FH/DS transmitting scheme, a main PN code generator 400 of n bits provides a subset of m bits to a pattern-detecting coincidence gate 410. When the selected m-bit pattern is recognized, a data gate 420 gates a burst of data bits into the DS spreader (via an exclusive-OR gate 430 feeding a balanced modulator 440. Simultaneously, a T flip-flop driven by the coincidence output line gates on a final RF power amplifier 450 to complete the time-hopped burst transmission process. An optional low pass filter 460 can be located between the balanced modulator 440 and an RF switch 470.

The corresponding TH/DS receiver depicted in FIG. 5 is similar to the FH/DS unit described in Example 1, except that the m bits extracted from a master PN generator 500 drive a coincidence detector 510 (which can be like the one in the transmitter of FIG. 4) rather than a frequency synthesizer. A flip-flop 520, once the system is synchronized, simply gates off the RF input until the desired time slot occurs.

Example 3

Figure 6:
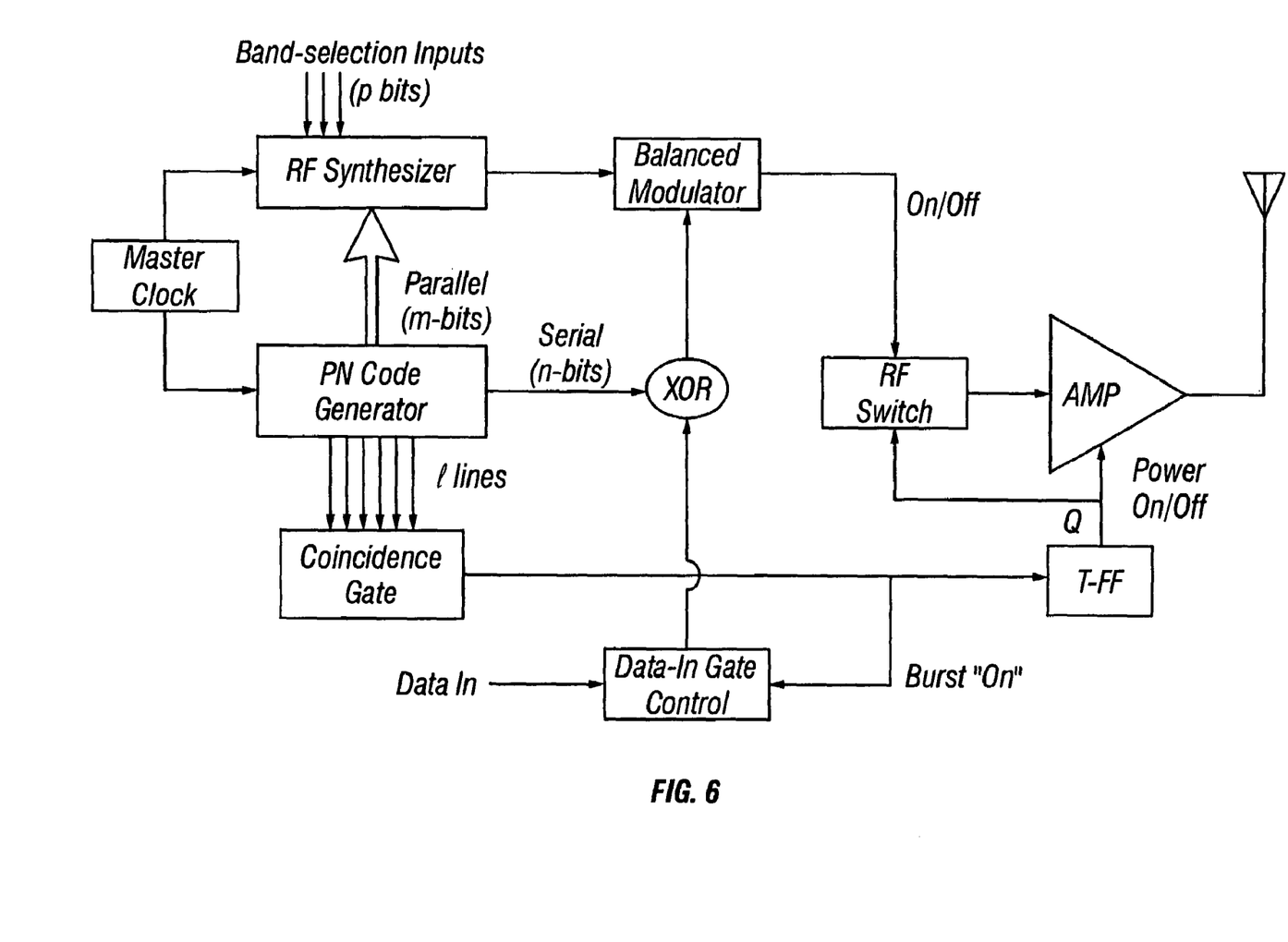
FIG. 6 illustrates a block schematic view of a hybrid frequency-hopping/time-hopping/direct-sequence spread-spectrum transmitter, representing an embodiment of the invention.
Figure 7:
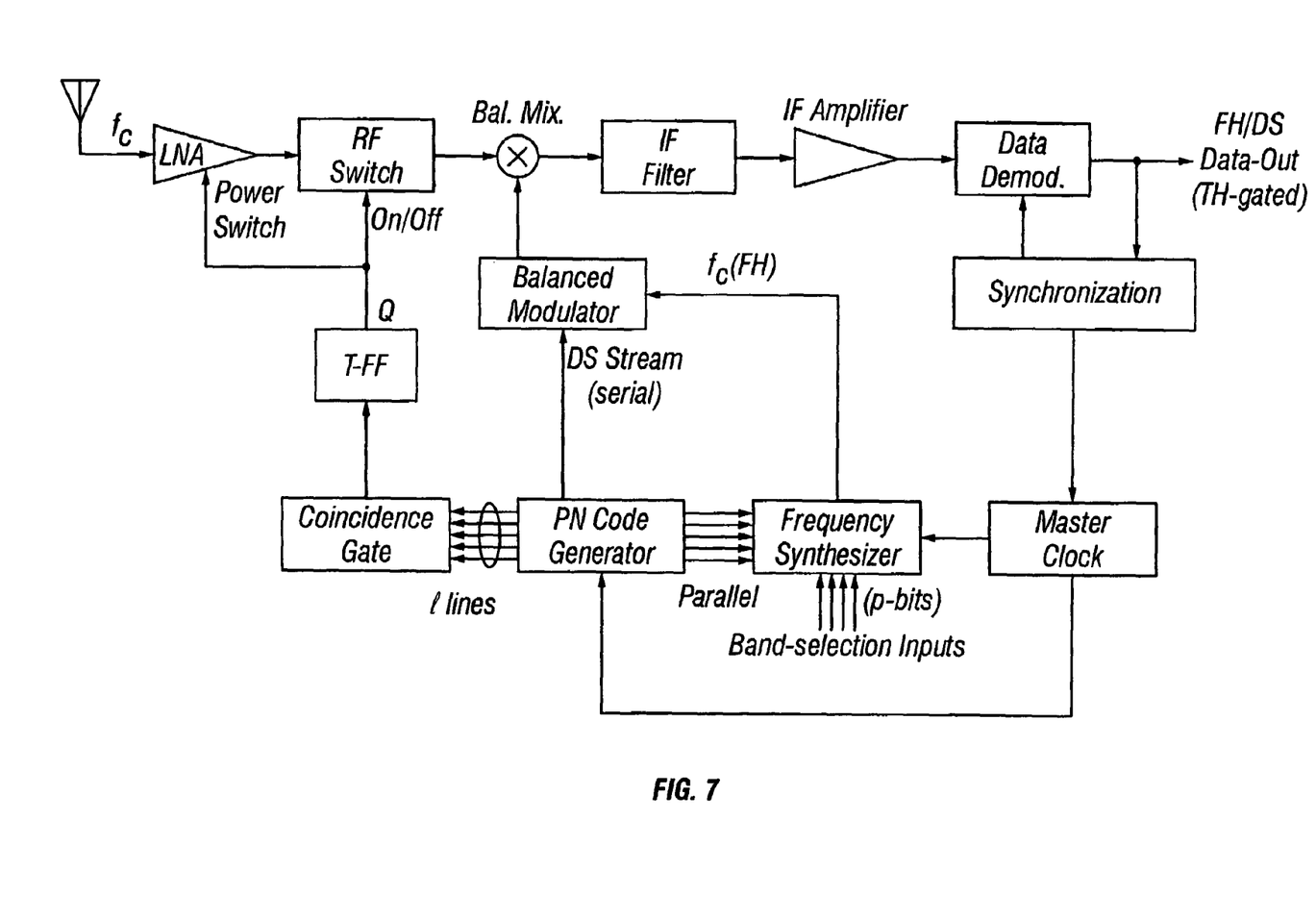
FIG. 7 illustrates a block schematic view of a hybrid frequency-hopping/time-hopping/direct-sequence spread-spectrum receiver, representing an embodiment of the invention.

FIGS. 6–7 depict hybrid FH/TH/DS transmitter and receiver block diagrams, respectively, which logically combine both FH/DS and TH/DS schemes to achieve more complex spreading distributions and afford even higher data security than the simpler types; the specific details can be the same as those in the previous examples.

PRACTICAL APPLICATIONS OF THE INVENTION

A practical application of the invention that has value within the technological arts is cellular telephony. Further, the invention is useful in conjunction with wideband communications (such as are used for the purpose of high-speed data links over coaxial or fiber), or the like. There are virtually innumerable uses for the invention, all of which need not be detailed here.

ADVANTAGES OF THE INVENTION

A system, representing an embodiment of the invention, can be cost-effective and advantageous for at least the following reasons. The invention can accommodate an increase in the number of normalized users. The invention can optimize the loading of users across multiple frequency channels. The invention can also provide increased immunity to multipath, interference, and jamming over previous methods. Further, the invention facilitates the implementation of receivers possessing rapid synchronization to the compositely modulated spread-spectrum signals with a minimal increase in hardware complexity over conventional units. The invention, via its correlation between the transmitted direct-sequence and frequency-hopping signal modulations, also facilitates the use of continuous-phase frequency hopping (CPFH) modulation to reduce transient spectral broadening or "splatter" in the transmitted signals.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration.

Further, the individual components need not be fabricated from the disclosed materials, but could be fabricated from virtually any suitable materials. Further, although the transmitters and/or receivers described herein can be physically separate modules, it will be manifest that the transmitters and/or receivers may be integrated into the apparatus with which it/they is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements.

The appended claims are not to be interpreted as including means-plus function limitations, unless such a limitation is explicitly recited in a given claim using the phrase "means for." Expedient embodiments of the invention are differentiated by the appended subclaims.

REFERENCES (1) Dixon, Robert, *Spread Spectrum Systems with Commercial Applications,* 3rd Edition, John Wiley & Sons, New York, 1998.
(2) Peterson, R. L., Ziemer, R. E., and Borth, D. E., *Introduction to Spread-Spectrum Communications*, Prentice Hall, Upper Saddle River, N.J., 1995.
(3) Kreyszig, Erwin, *Advanced Engineering Mathematics,* 8th Edition, John Wiley & Sons, New York 1999.

What is claimed is:

1. A method, comprising overlapping a plurality of direct-sequence spread-spectrum signals using carrier frequencies that are i) each precisely an integer multiple of a bit rate and ii) orthogonally spaced relative to an integral multiple of the bit rate rather than a chip rate, wherein the chip rate is an integer multiple of the bit rate and is greater than or equal to two and wherein the product of two of the plurality of direct-sequence spread-spectrum signals, independent of their relative starting phases, will integrate to zero and an integration time to define orthogonality is 1/Tb, where 1/Tb the bit rate.

2. A method of claim 1, further comprising common frequency-hopping encoding said plurality of direct-sequence spread-spectrum signals.

3. The method of claim 1, further comprising individual, differential frequency-hopping encoding each of said plurality of direct-sequence spread-spectrum signals.

4. The method of claim 1, wherein frequency-hopping modulation is performed in a continuous-phase manner.

5. The method of claim 1, further comprising time-hopping encoding said plurality of direct-sequence spread-spectrum signals.

6. The method of claim 5, further comprising frequency-hopping encoding said plurality of direct-sequence spread-spectrum signals.

7. The method of claim 1, wherein overlapping includes synchronously allocating each of a plurality of users to one of a plurality of orthogonal channels.

8. The method of claim 1, wherein overlapping includes encoding a frequency shift in a subset of bits that define a code word.

9. The method of claim 1, wherein overlapping includes establishing a bit-clock synchronization; and further comprising multiplying an incoming signal by an estimate of a desired signal; and integrating a product over an integral multiple of a bit period rather than a chip period.

10. The method of claim 1, further comprising retransmitting one of said plurality of direct-sequence spread-spectrum signals.

11. The method of claim 1, further comprising checking one of said plurality of direct-sequence spread-spectrum signals with an error-correcting code.

12. A computer program stored on a computer readable medium comprising computer- or machine-readable program elements translatable for implementing a method of signal transmission including overlapping a plurality of direct-sequence spread-spectrum signals using carrier frequencies that are i) each precisely an integer multiple of a bit rate and ii) orthogonally spaced relative to an integral multiple of the bit rate rather than a chip rate, wherein the chip rate is an integer multiple of the bit rate and is greater than or equal to two and wherein the product of two of the plurality of direct-sequence spread-spectrum signals, independent of their relative starting phases, will integrate to zero and an integration time to define orthogonality is 1/Tb, where 1/Tb the bit rate.

13. A computer program stored on a computer readable medium comprising computer program means adapted to perform the steps of overlapping a plurality of direct-sequence spread-spectrum signals using carrier frequencies that are i) each precisely an integer multiple of a bit rate and ii) orthogonally spaced relative to an integral multiple of the bit rate rather than a chip rate, wherein the chip rate is an integer multiple of the bit rate and is greater than or equal to two and wherein the product of two of the plurality of direct-sequence spread-spectrum signals, independent of their relative starting phases, will integrate to zero and an integration time to define orthogonality is 1/Tb, where 1/Tb the bit rate.

14. A method, comprising providing a direct-sequence spread-spectrum communication system that increases a number of users by utilizing a plurality of closely spaced orthogonal carriers that are i) each precisely an integer multiple of a bit rate and ii) produce overlapping spectra, wherein a spacing of the plurality of orthogonal carriers is based on an integral multiple of the bit rate and not a chip rate, wherein the chip rate is an integer multiple of the bit rate and is greater than or equal to two and wherein the product of two of the plurality of direct-sequence spread-spectrum signals, independent of their relative starting phases, will integrate to zero and an integration time to define orthogonality is 1/Tb, where 1/Tb the bit rate.

15. The method of claim 14, further comprising frequency-hopping encoding the overlapping spectra.

16. The method of claim 14, further comprising time-hopping encoding the overlapping spectra.

17. The method of claim 16, further comprising frequency-hopping encoding the overlapping spectra.

18. A method, comprising overlapping a plurality of synchronous direct-sequence spread-spectrum signals using carrier frequencies with zero relative phase differences that are i) each precisely an integral multiple of ½ a bit rate and ii) orthogonally spaced relative to an integral multiple of ½ the bit rate rather than a chip rate, wherein the chip rate is an integral multiple of the bit rate and is greater than or equal to two and wherein the product of two of the plurality of direct-sequence spread-spectrum signals, independent of their relative starting phases, will integrate to zero and an integration time to define orthogonality is 1/Tb, where 1/Tb the bit rate.

19. The method of claim 18, further comprising common frequency-hopping encoding said plurality of direct-sequence spread-spectrum signals.

20. A method, comprising overlapping a plurality of synchronous direct-sequence spread-spectrum signals using carrier frequencies with relative phase differences that are i) each precisely an integral multiple of $½^x$ a bit rate, where x is a counting number and an integer and ii) orthogonally spaced relative to one half the integral multiple of $½^x$ of the bit rate rather than a chip rate, wherein the chip rate is an integral multiple of the bit rate and is greater than or equal to two and wherein the product of two of the plurality of direct-sequence spread-spectrum signals, independent of their relative starting phases, will integrate to zero and an integration time to define orthogonality is 1/Tb, where 1/Tb the bit rate.

21. The method of claim 18, further comprising time-hopping encoding said plurality of direct-sequence spread-spectrum signals.

22. The method of claim 20 further comprising common frequency-hopping encoding said plurality of direct-sequence spread-spectrum signals.

23. The method of claim 20, further comprising time-hopping encoding said plurality of direct-sequence spread-spectrum signals.

24. The method of claim 1, wherein integration to zero is characterized by $$\int_{t}^{t+T_x} \cos(\omega_1(t)) * PN_1(t) * m_1(t) * \cos(\omega_2(t)) * PN_2(t) * m_2(t)dt = 0$$

where $\omega_1$ is a first carrier frequency, $\omega_2$ is a second carrier frequency, $PN_1$ is a first spreading code, $PN_2$ is a second spreading code, $m_1$ is a first digital message signal, $m_2$ is a second digital message signal, t is time and $T_x$ is set equal to $T_b$ or integral multiples of $T_b$, where $1/T_b$ is a data rate.

25. The computer program of claim 12, wherein integration to zero is characterized by $$\int_{t}^{t+T_x} \cos(\omega_1(t)) * PN_1(t) * m_1(t) * \cos(\omega_2(t)) * PN_2(t) * m_2(t)dt = 0$$

where $\omega_1$ is a first carrier frequency, $\omega_2$ is a second carrier frequency, $PN_1$ is a first spreading code, $PN_2$ is a second spreading code, $m_1$ is a first digital message signal, $m_2$ is a second digital message signal, t is time and $T_x$ is set equal to $T_b$ or integral multiples of $T_b$, where $1/T_b$ is a data rate.

26. The computer program of claim 13, wherein integration to zero is characterized by $$\int_{t}^{t+T_x} \cos(\omega_1(t)) * PN_1(t) * m_1(t) * \cos(\omega_2(t)) * PN_2(t) * m_2(t)dt = 0$$

where $\omega_1$ is a first carrier frequency, $\omega_2$ is a second carrier frequency, $PN_1$ is a first spreading code, $PN_2$ is a second spreading code, $m_1$ is a first digital message signal, $m_2$ is a second digital message signal, t is time and $T_x$ is set equal to $T_b$ or integral multiples of $T_b$, where $1/T_b$ is a data rate.

27. The method of claim 14, wherein integration to zero is characterized by $$\int_{t}^{t+T_x} \cos(\omega_1(t)) * PN_1(t) * m_1(t) * \cos(\omega_2(t)) * PN_2(t) * m_2(t) dt = 0$$

where $\omega_1$ is a first carrier frequency, $\omega_2$ is a second carrier frequency, $PN_1$ is a first spreading code, $PN_2$ is a second spreading code, $m_1$ is a first digital message signal, $m_2$ is a second digital message signal, t is time and $T_x$ is set equal to $T_b$ or integral multiples of $T_b$, where $1/T_b$ is a data rate.

28. The method of claim 18, wherein integration to zero is characterized by $$\int_{t}^{t+T_x} \cos(\omega_1(t)) * PN_1(t) * m_1(t) * \cos(\omega_2(t)) * PN_2(t) * m_2(t) dt = 0$$

where $\omega_1$ is a first carrier frequency, $\omega_2$ is a second carrier frequency, $PN_1$ is a first spreading code, $PN_2$ s a second spreading code, $m_1$ is a first digital message signal, $m_2$ is a second digital message signal, t is time and $T_x$ is set equal to $T_b$ or integral multiples of $T_b$, where $1/T_b$ is a data rate.

29. The method of claim 20, wherein integration to zero is characterized by $$\int_{t}^{t+T_x} \cos(\omega_1(t)) * PN_1(t) * m_1(t) * \cos(\omega_2(t)) * PN_2(t) * m_2(t) dt = 0$$

where $\omega_1$ is a first carrier frequency, $\omega_2$ is a second carrier frequency, $PN_1$ is a first spreading code, $PN_2$ is a second spreading code, $m_1$ is a first digital message signal, $m_2$ is a second digital message signal, t is time and $T_x$ is set equal to $T_b$ or integral multiples of $T_b$, where $1/T_b$ is a data rate.

30. The method of claim 1, further comprising cycling through a set of frequencies in a manner known to a receiver.

31. The computer program of claim 12, further comprising cycling through a set of frequencies in a manner known to a receiver.

32. The computer program of claim 13, further comprising cycling through a set of frequencies in a manner known to a receiver.

33. The method of claim 14, further comprising cycling through a set of frequencies in a manner known to a receiver.

34. The method of claim 18, further comprising cycling through a set of frequencies in a manner known to a receiver.

35. The method of claim 20, further comprising cycling through a set of frequencies in a manner known to a receiver.

* * * * *